No. 745,655. PATENTED DEC. 1, 1903.
F. R. PACKHAM.
DISK DRILL.
APPLICATION FILED SEPT. 14, 1903.
NO MODEL. 2 SHEETS—SHEET 1.
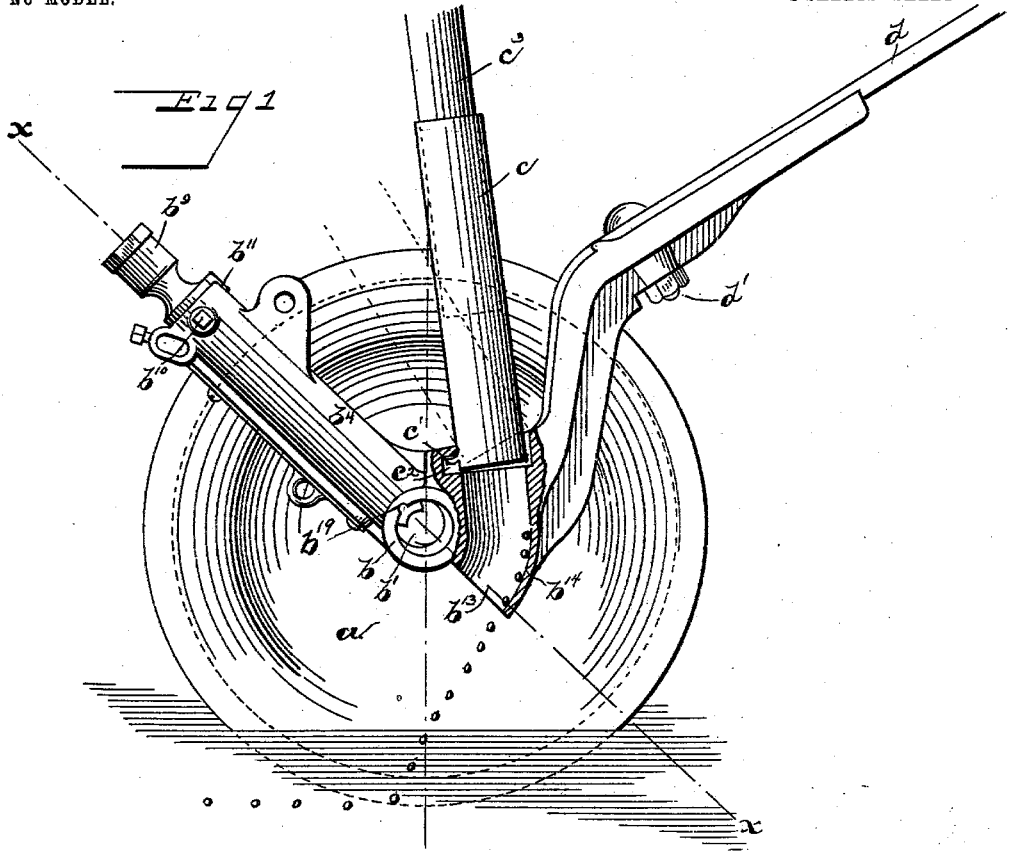
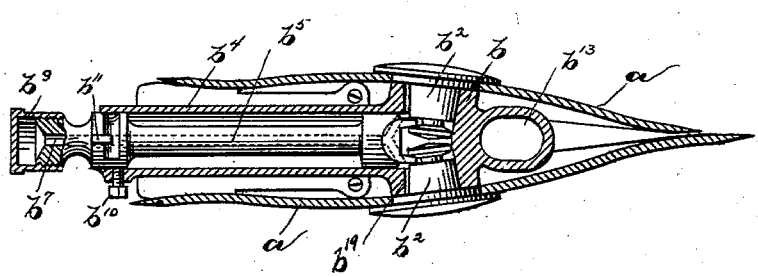
Witnesses
Inventor
Frank R. Packham
By ... Attorneys No. 745,655. PATENTED DEC. 1, 1903.
F. R. PACKHAM.
DISK DRILL.
APPLICATION FILED SEPT. 14, 1903.
NO MODEL. 2 SHEETS—SHEET 2.
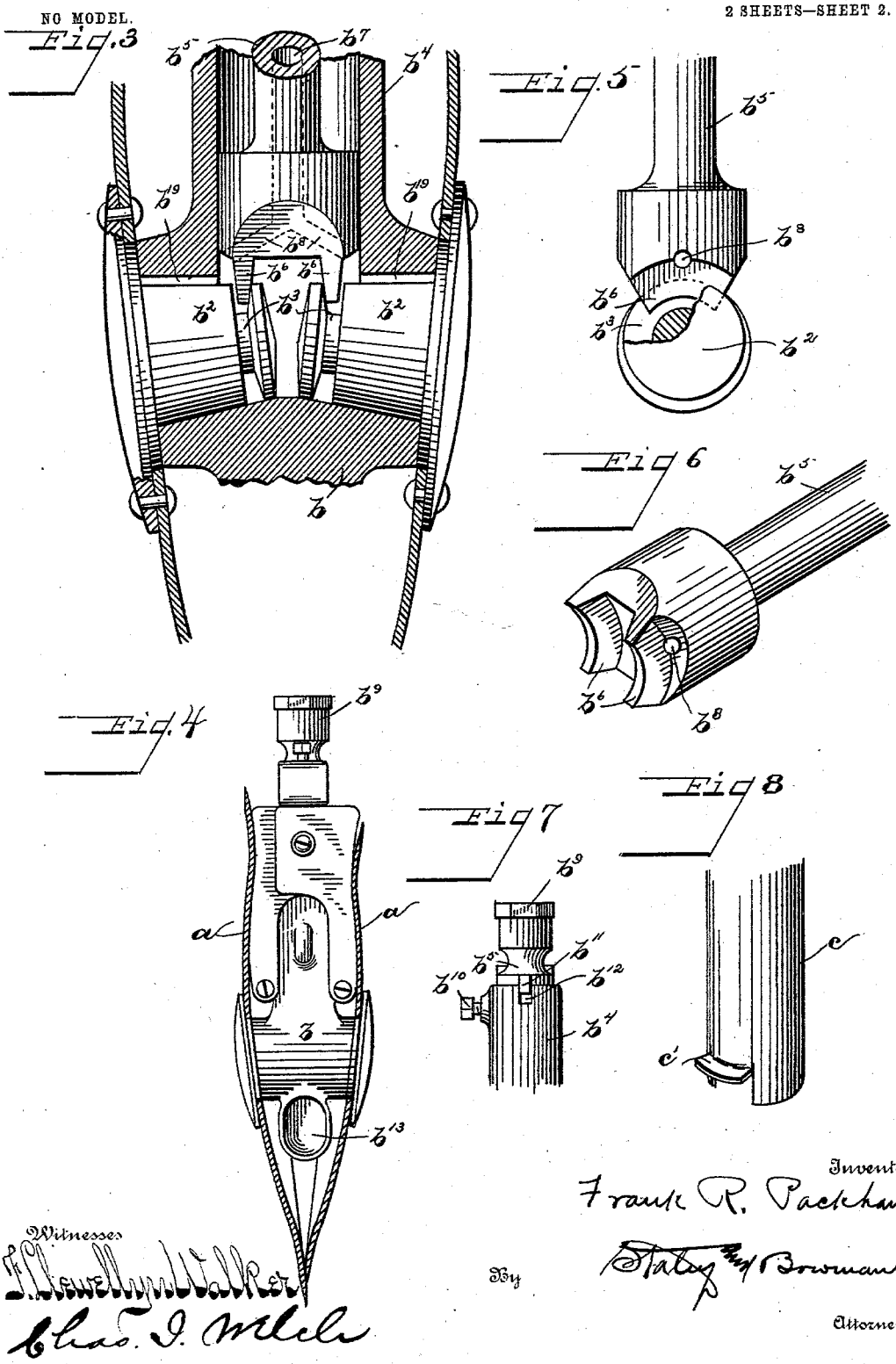

No. 745,655.   
Patented December 1, 1903.

UNITED STATES PATENT OFFICE.

FRANK R. PACKHAM, OF SPRINGFIELD, OHIO, ASSIGNOR TO AMERICAN SEEDING MACHINE COMPANY, OF JERSEY CITY, NEW JERSEY, A CORPORATION OF NEW JERSEY.

DISK DRILL.

SPECIFICATION forming part of Letters Patent No. 745,655, dated December 1, 1903.

Application filed September 14, 1903. Serial No. 173,089. (No model.)

*To all whom it may concern:*

Be it known that I, FRANK R. PACKHAM, a citizen of the United States, residing at Springfield, in the county of Clark and State of Ohio, have invented certain new and useful Improvements in Disk Drills, of which the following is a specification.

My invention relates to improvements in disk drills, and more particularly to drills employing twin disks or double disks as furrow-openers; and my improvements relate particularly to the furrow-opening devices.

My object is to provide an improved disk-support and conduit adapted for use in combination with twin disks or double disks that will be practically dust-proof for the bearings of the disk and so arranged that the grain conducted through the grain-conduit will be delivered into the completed furrow, and thereby avoid the danger of delivering the seed so that it is only partly placed in the bottom of the completed furrow.

I am aware that in prior devices the grain is directed to the furrow between the twin or double disks; but in these devices there is danger of the grain striking upon the converging edges of the revolving disks, and thereby failing to be delivered in the bottom of the trench. If the grain is delivered in front of the axial center of the disk, even though conducted with closed tubes to the furrow, there is danger of the seed not reaching the bottom of the furrow, but mingling with the soil as it surges through the opening below the one point of contact of the disks, it being obvious that the disks can only closely contact at one point in the front and that below this point or to the rear of it there is an opening through which the soil or dirt can pass.

A further object is to provide an improved form of bearing with no projections on the exterior sides of the disks, together with means for readily locking the spindles on which the disks bear to their respective bearings, with means for readily adjusting the position of the disks.

In the drawings, Figure 1 is a side elevation of one of the disks with the disk-support partly in section. Fig. 2 is a transverse section through the twin disks and the support, taken on the line $x\ x$ of Fig. 1. Fig. 3 is a detail of the bearing or support for the disk, part sectional. Fig. 4 is a detail of the bearing, showing the inclined discharge-opening therein. Figs. 5, 6, and 7 are detail views of the oil-conduit. Fig. 8 is a detail view of the seed-conduit.

Like parts are represented by similar characters of reference in the several views.

The bearing or support for the disks $a$ is indicated by the letter $b$. There are formed in this bearing or support openings $b'$, Fig. 1, and within these openings the spindles $b^2$, Fig. 3, of the disks are adapted to fit. As shown in Fig. 3, these spindles extend inwardly from the concave side of the disk, and same are riveted on the convex side in such manner that there is no opening or aperture through the disk for dust or other substances to penetrate. The spindles $b^2$ for the twin disks are formed at their inner ends with grooves $b^3$; and the spindles are shown slightly separated at their inner ends, so as to allow for adjustment for taking up the end movement of the disks in the manner hereinafter described. The spindles fit closely within the openings formed in the bearing or support $b$, and by reason of the arrangement of the spindles with reference to the disks and the bearings I have formed a bearing which is absolutely dust-proof. The disk-spindles are shown at different angles to line of draft and to the vertical. There is formed integrally with said support an upwardly-extending sleeve $b^4$, Fig. 3, which sleeve extends beyond the periphery of the disks, as shown in Fig. 1. Within this sleeve or spout there is placed an oil-conduit $b^5$ of peculiar formation. At its lower end the oil-conduit $b^5$ is formed with projecting lugs $b^6$, (see Figs. 3 and 6,) and these lugs are formed with inclined faces, as shown in Fig. 3, and are adapted to fit within the grooves $b^3$, formed at the inner ends of the spindles $b^2$, said lugs being formed at different angles with reference to each other and to the oil-conduit to correspond to the different angles at which the respective disks stand to this line of draft. It will readily be seen from an examination of Fig. 3 that the grooves $b^3$ being formed with inclined faces against which the inclined faces of the lugs $b^6$ contact, that when the oil-conduit $b^5$ is forced downwardly the inclined faces of the projecting lugs tend to force the spindles $b^2$ inwardly, and thereby tighten up the same. The oil-conduit $b^5$ is formed with an aperture extending vertically downward, (marked $b^7$,) and at its lower end the oil-conduit is formed with two branches, (indicated by the dotted lines in Fig. 3,) marked $b^8$. (See Fig. 6.) These branches or channels are so directed that the oil or grease will drop upon the ends of the spindles $b^2$, as indicated in Fig. 3, and be forced into channels $b^{19}$, formed in the bearing or support $b$, above the spindles $b^2$, where it will be in a position to at all times keep said spindles properly lubricated. At its upper end the oil-conduit is screw-threaded, as indicated in Fig. 2, and has a cap $b^9$, which is adapted to be filled with hard oil, lard, or some other form of lubrication. This screw-cap fits upon the upper end of the spindle, and the oil, lard, or other substance may be forced to the journals by revolving the screw-cap, which engages the threaded portion of the upper end of the oil-conduit.

I have shown in Fig. 2 a set-screw $b^{10}$, which is adapted to hold the oil-conduit $b^5$ in its proper position. By loosening the set-screw and forcing the oil-conduit downwardly I can change the adjustment of the spindles and by tightening the set-screw retain same in their adjusted position.

I have shown in Fig. 7 the oil-conduit $b^5$ as formed with a lug $b^{11}$, and this lug extends outwardly and is adapted to fit within a notch $b^{12}$, formed in the sleeve or spout $b^4$ of the bearing. By this arrangement I provide means for properly assembling the parts, as by reason of the different angles of the disks and their spindles and the lugs $b^6$, which fit in the grooves formed in said spindles, said lugs must always be properly seated in said grooves.

The bearing or support $b$ is formed with a discharge-opening of peculiar form. As shown in Fig. 1, this discharge-opening is curved and extends from a point above the axial center of the disk and back of same to a point almost below the axial center of the disk. The outer side $b^{14}$ of this discharge-opening formed in the bearing is curved in such a manner as to deflect the seed to a point back of a line drawn vertically through the axial center of the disk, as shown in Fig. 1. My purpose in this formation is to enable the seed to be delivered to the discharge-opening at a point in front of the axial center of the disk and to be deflected through the discharge-opening in a manner to insure its being delivered to the furrow at a point in the rear of a line or vertical plane through the axes of the disks or in the finished part of the furrow, all that part of the furrow in front of said line being in an unfinished condition. It will readily be understood that the disks converge in front of their axes and that if the seed is delivered in front thereof there will be great danger of it striking the converging inner faces of the disks and falling in the unfinished part of the furrow and that this danger is entirely obviated when the seed is deflected toward the rear of the disks; but in double-disk constructions prior to my invention, where the grain is conveyed down to the furrow by a discharge-opening in the rear of the axial center of the disks, great difficulty is experienced from the fact that mud and sticky soils coming in between the disks will be carried by reason of the rotation of the disks to the discharge-opening for the seed, which will then be clogged or obstructed, preventing the proper discharge of the grain or seed. By my arrangement the discharge end of the conduit is located in front of a plane or line drawn through the axis or center of the disk and is in a protected position and yet directs the grain to the rear of said plane or line, avoiding the danger of obstructing mud or other substances carried by the disk and delivering the grain to the furrow at a point in the rear of a plane drawn vertically through the axis of the disk. The outer wall $b^{14}$ being curved, as shown in Fig. 1, is adapted to deflect mud and other substances, and the rotation of the disks in a downward direction tends to carry the mud away from the discharge-opening.

I have shown a grain-spout $c$ with a projecting plate or finger $c'$ at its lower end which is adapted to fit within an enlarged opening $c^2$, formed in the bearing $b$. The seed-spout, as shown in Fig. 1, can readily be detached by moving it out of normal position until the plate or finger $c'$ can be withdrawn from the enlarged opening $c^2$, and yet while the spout is held in its normal upright position by the tube $c^3$ same cannot be detached, but is held in engagement with the bearing $b$, and the tube $c^3$, the spout $c$, and the discharge-opening $b^{13}$ form a closed conduit for the seed from the hopper of the machine, to which the spout $c^3$ is attached in the usual manner. I have also shown connections to the sleeve or spout for the oil-conduit for the pressure-rods and their springs, and thereby present a complete furrow-opening device of the twin or double disk type of novel and useful construction.

The drag-bar $d$ is attached to the bearing by a rivet or bolt $d'$, as shown in Fig. 1.

It will be seen that there are no hub projections on the exterior of the disk, and the spindles are attached to the bearings without any obstructions being in the space between the disks, such as bolts or hub extensions. The bearings are thus completely protected from dirt, the only possible point where dirt could work into the bearing being when the disks bear against the support $b$, and at this point the dirt will be prevented from entering by reason of the fact that the lubricant after entering the channels in said support will be forced into any intervening space that may occur between said disks and the support, and thus exclude the dirt.

Having thus described my invention, I claim—

1. In a disk drill, the combination of a support, a feed-conduit adapted to fit within said support, and a discharge-opening through said support with the lower end adapted to deflect the seed to the rear of the support.

2. In a disk drill, the combination of double disks with a support and a seed-conduit adapted to fit within the support, a discharge-opening formed in said support and located in front of the axial center of the disks but curved rearwardly and adapted to deflect the seed entering in said discharge-openings in front of the axial center to a point below and in the rear of the axial center, for the purpose specified.

3. In a double-disk drill, the combination of double disks with a support, openings formed in said support and spindles attached to said disks extending inwardly and adapted to fit within the openings formed in said support, means for holding said spindles within said support and further adapted to adjust same without the use of bolts or other analogous devices, for the purpose specified.

4. In a double-disk drill, the combination of the disks with the support, openings formed in said support, spindles on said disks adapted to fit within said openings, an oil-conduit also fitted within said support and adapted at its lower end to engage the inner ends of said spindles, for the purpose specified.

5. In a double-disk drill, the combination of the disks with the support, openings formed in said support, spindles on said disks adapted to fit within said openings, an oil-conduit also fitted within said support formed at its lower end with inclined faces adapted to engage the inner ends of said spindles, for the purpose specified.

6. In a double-disk drill, the combination of the disks with the support, openings formed in said support, spindles on said disks adapted to fit within said openings, an oil-conduit also fitted within said support formed at its lower end with inclined faces adapted to engage the inner ends of said spindles, inclined faces formed on the inner ends of said spindles with which the inclined faces on the lower end of the oil-conduit engage, for the purpose specified.

7. In a double-disk drill, the combination of the disks with the support, openings formed in said support, spindles on said disks adapted to fit within said openings, an oil-conduit also fitted within said support formed at its lower end with inclined faces adapted to engage the inner ends of said spindles, an oil-cap for holding the lubricating medium, and channels connecting said oil-conduit with the inner end of said spindles, for the purpose specified.

8. In a double-disk drill, the combination of the disks with the support, openings formed in said support, spindles on said disks adapted to fit within said openings, an oil-conduit also fitted within said support formed at its lower end with inclined faces adapted to engage the inner ends of said spindles, means for holding the oil-conduit in adjusted position for locking the spindles within the support.

9. In a double-disk drill, the combination of the disks with the support, openings formed in said support, spindles on said disks adapted to fit within said openings, an oil-conduit also fitted within said support formed at its lower end with inclined faces adapted to engage the inner ends of said spindles, and a set-screw adapted to hold the oil-conduit in adjusted position for locking the spindles, for the purpose specified.

10. In a disk drill, the combination of double disks with the support, a sleeve formed integrally with said support and extending upward toward the periphery of the disks, an oil-conduit adapted to fit within said sleeve, spindles formed on said disks adapted to fit within the support, projecting lugs on the lower end of the oil-conduit adapted to engage the inner ends of said spindles, and means for adjusting the oil-conduit within the sleeve, and a holding device for locking same in adjusted position, for the purpose of locking said spindles within said support.

11. In a disk drill, the combination of double disks with the support, a discharge-opening formed within said support located in front of the axial center of the disk and curved in a manner to deflect the seed toward the rear of the axial center, a seed-conduit also adapted to fit within said support, a projecting lug on said conduit and openings in said support within which said lug fits but adapted to be released therefrom by the movement of said conduit out of its normal position.

In testimony whereof I have hereunto set my hand this 10th day of September, A. D. 1903.

FRANK R. PACKHAM.

Witnesses:
CHAS. I. WELCH,
CLIFTON P. GRANT.